May 26, 1931.     J. J. VICENZI     1,807,053
MOLDING APPARATUS
Filed Dec. 12, 1929     3 Sheets-Sheet 2
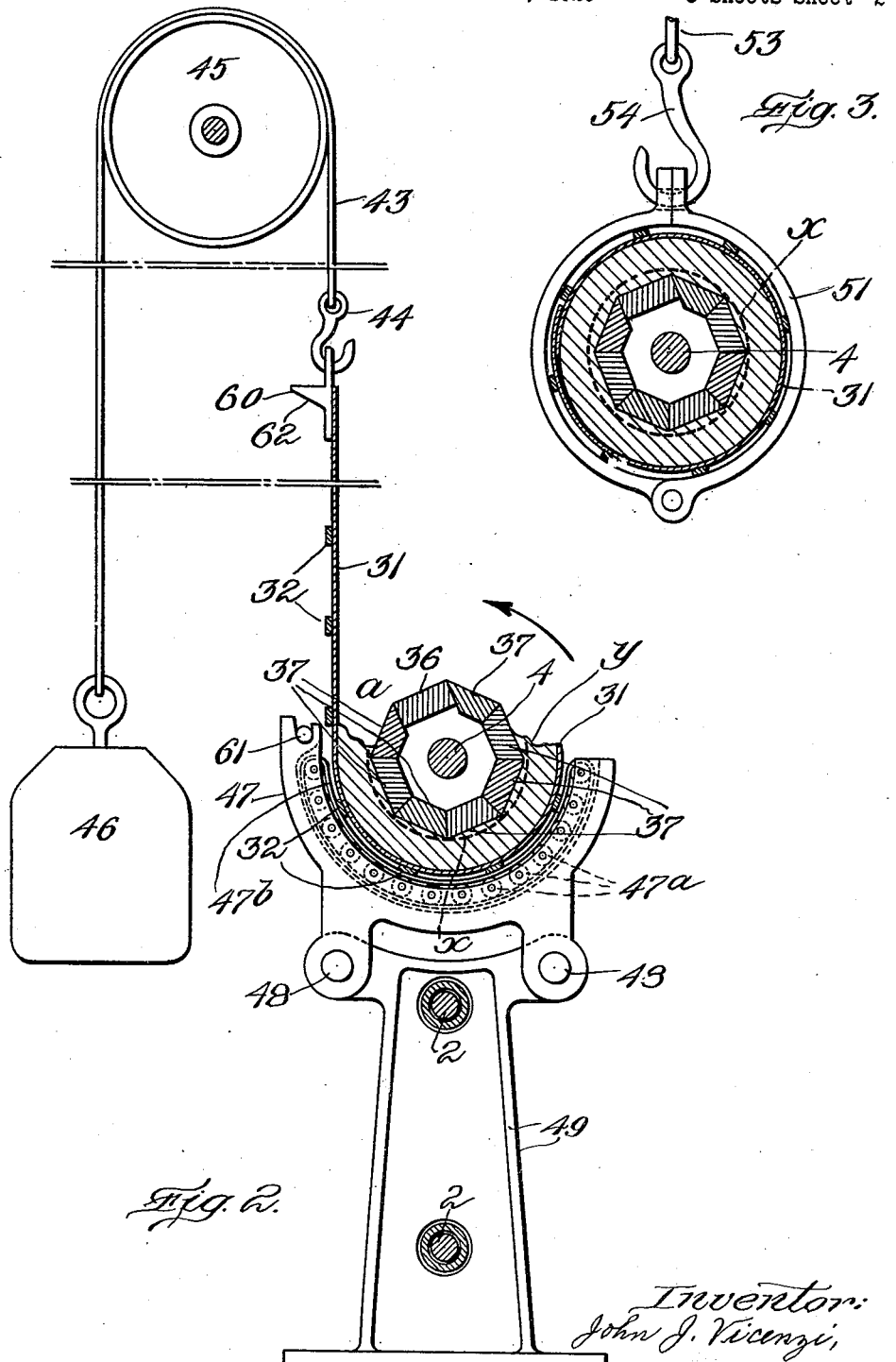

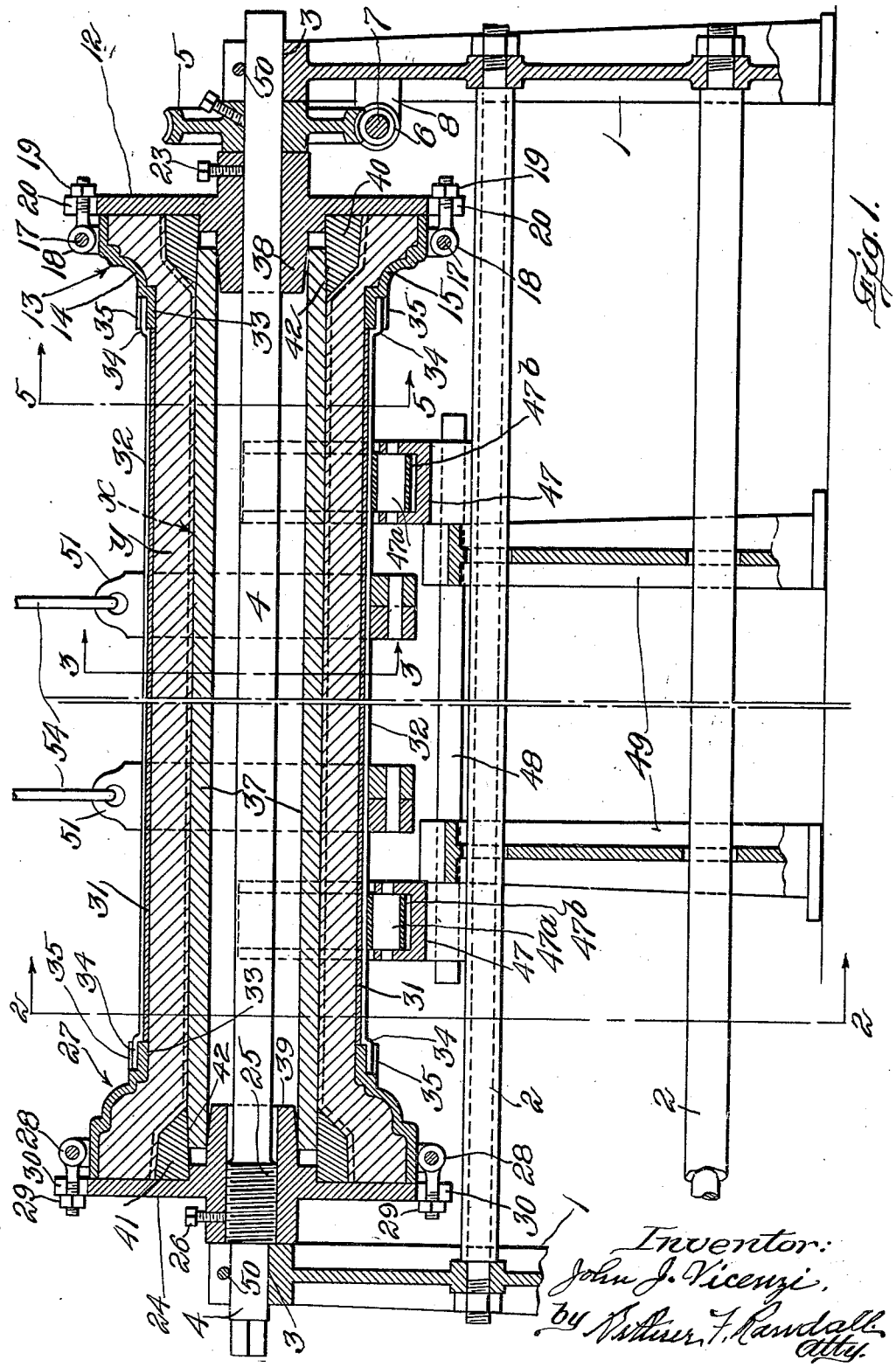

May 26, 1931. J. J. VICENZI 1,807,053
MOLDING APPARATUS
Filed Dec. 12, 1929 3 Sheets-Sheet 3
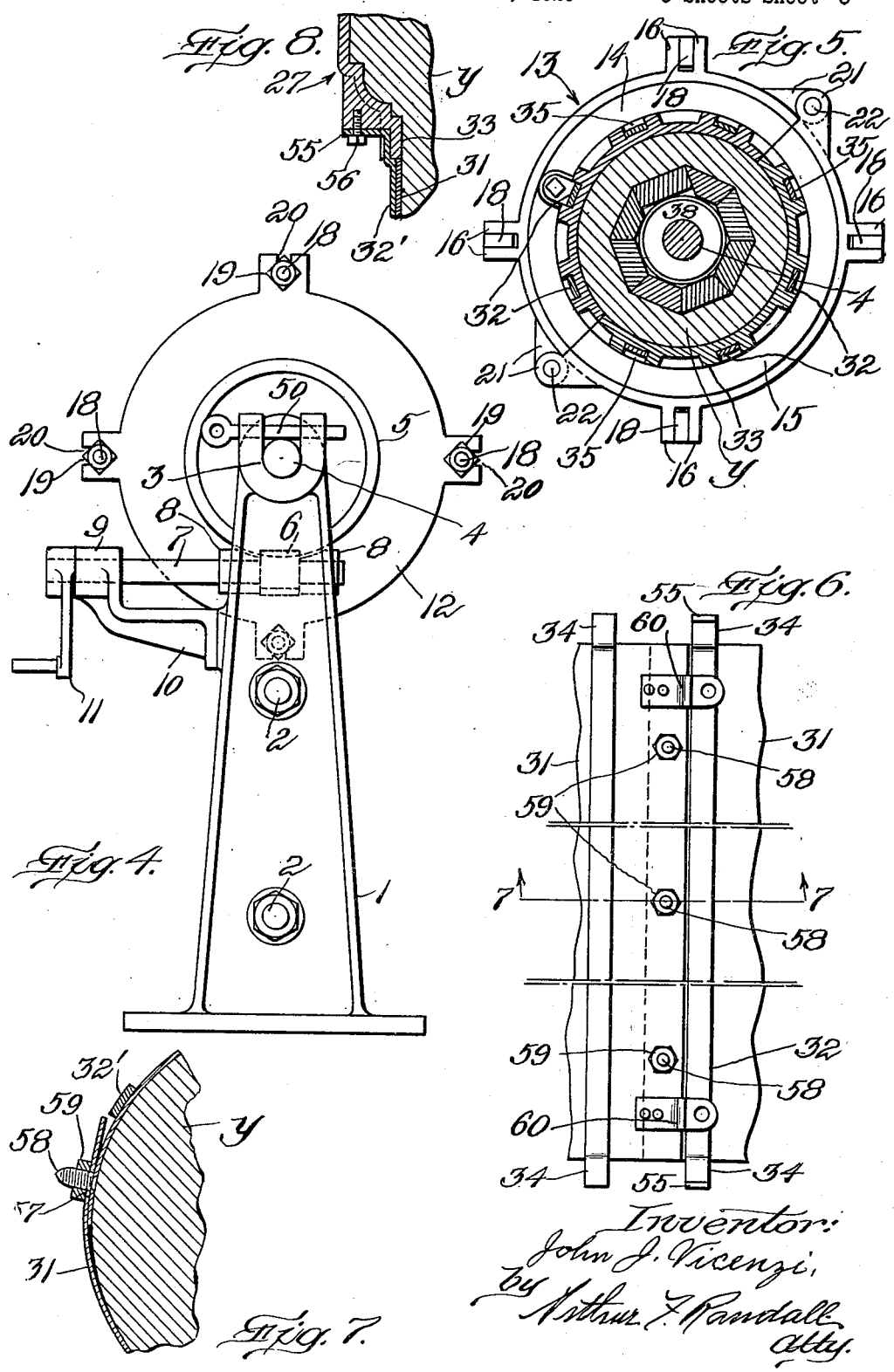

Patented May 26, 1931

1,807,053

UNITED STATES PATENT OFFICE

JOHN J. VICENZI, OF BOSTON, MASSACHUSETTS

MOLDING APPARATUS

Application filed December 12, 1929. Serial No. 413,457.

My invention relates to apparatus for use in molding columns and it has for its object to provide improved apparatus of this class by means of which building columns and the like can be expeditiously and accurately produced at the expenditure of a minimum amount of labor.

To these ends I have provided an apparatus of the class described having the peculiar features of construction and mode of operation set forth in the following description, the several novel features of the invention being particularly pointed out and defined in the claims at the close thereof.

In the accompanying drawings:

Figure 1 is a side elevation, partly in section and partly broken away, of a molding apparatus constructed in accordance with my invention.

Figure 2 is a section on line 2—2 of Figure 1.

Figure 3 is a section on line 3—3 of Fig. 1.

Figure 4 is an end elevation of the apparatus shown in Figure 1.

Figure 5 is a section on line 5—5 of Figure 1.

Figure 6 is a plan view of the opposite end portions of the apron hereinafter described after said ends have been fastened.

Figure 7 is a section on line 7—7 of Figure 6.

Figure 8 is a detail hereinafter described.

In the preferred form of my invention, herein illustrated, the apparatus comprises a frame including two end uprights 1, 1 rigidly connected by tierods 2, said uprights having base portions adapted to seat upon a floor and to be secured thereto in any suitable manner as by means of bolts.

At their upper ends the uprights 1 are made with alined sockets 3 within which rest the opposite end portions of a shaft 4 on which is fastened a worm gear 5 in mesh with a worm 6 fast on a short horizontal shaft 7 journaled in bearings 8 provided upon the inner side of one of the uprights 1.

As shown in Fig. 4 the shaft 7 extends outwardly from its supporting upright 1 and through another bearing 9 provided on a bracket 10, said shaft having fixed in position upon its outer end portion a crank handle 11 by means of which it is manually rotated as presently to be described.

Mounted on shaft 4 alongside of worm gear 5 is a head consisting of a disc 12 and a two-part annulus 13.

The annulus 13 comprises two semi-circular sections 14 and 15 and is provided with four radially extending pairs of lugs 16, each of said pairs being pivotally connected at 17 to the apertured head of an eye-bolt 18 carrying a nut 19 and each eye-bolt 18 extending from the annulus 13 through radial slots 20 provided adjacent the periphery of the disc member 12. When the nuts 19 are screwed up tight, the annulus 13 is clamped securely in position against the inner face of the disc member 12.

The two sections 14 and 15 of the annulus 13 are made upon their peripheries and at their abutting ends with overlapping apertured lugs 21 that are fastened together by removable pins or bolts 22.

The disc member 12 is fitted upon the shaft 4 and rigidly secured thereto by means of a set screw 23.

At the opposite end of the machine is provided another head comprising a disc member 24 made at its middle with a threaded hole that is screwed on to a threaded portion 25 of shaft 4 and secured fixedly in position upon the latter by means of a set screw 26. This head also includes a two-part annulus 27 constructed practically the same as the annulus 13 adjacent the opposite end of shaft 4. This annulus 27 is likewise fastened by eye-bolts 28 and nuts 29 to the disc member 24, said disc member being provided adjacent its periphery with open ended slots 30 for the reception of the shank portions of the eye-bolts 28.

The molding head 12—13 adjacent one end of shaft 4 is constructed to shape the exterior of the capital of the column while the molding head 24—27 adjacent the opposite end of shaft 4 is constructed to mold the exterior of the base of the column.

Between the inner ends of the two annuluses 13 and 27, and fitting at its opposite sides against the same, is a thin flexible sheet metal apron or sheath 31 upon the exterior of which are provided transverse reinforcing strips or slats 32 and a single slat 32′ which may be secured to said apron in any suitable fashion as by welding, rivets or the like. These reinforcing strips or slats 32 and 32′ are distributed at regular intervals throughout the length of the apron 31 and serve to hold the latter against flexing longitudinally. Also they serve, as presently to be described, to couple the apron to the two end heads.

The opposite end portions of the strips 32 extend beyond the side edges of the apron 31 and are offset so as to overlap circular flanges 33 provided at the inner ends of the annuluses 13 and 27.

During the operation of the apparatus the apron 31 is wrapped around the column that is being molded and the extended end portions 34 of the strips 32 and 32′ intermesh with sockets 35 provided on the circular flanges 33 and thus couple the heads and apron together.

On the shaft 4, between discs 12 and 24, is provided a collapsible core structure including a circular series of slats 36 and 37, said series consisting of one key slat 36 and seven complementary slats 37.

The opposite ends of the slats 36 and 37 are supported interiorly by hubs 38 and 39 provided, respectively, on the discs 12 and 24, and exteriorly by rings 40 and 41 mounted, respectively, upon the hubs 38 and 39. The end portions of the outer faces of the slats 36 and 37 are beveled slightly as shown at 42 to fit the interiors of the rings 40 and 41 which are made conical. It will therefore be clear that when, in assembling the parts of the apparatus, the disc 24 is screwed along shaft 4 toward the disc 12, the two rings 40 and 41 will be forced on to the beveled ends of the slats 36 and 37 and thereby be caused to clamp said slats firmly together upon the hubs 38 and 39. After firmly securing the slats 36 and 37 in position as described the set screw 26 is set up tight and the apparatus is in condition to be used.

At the start of the operation of forming a column the opposite ends of strip 32′ which is located at one end of the apron 31, is engaged with a pair of sockets 35 on the flanges 33 said opposite ends being provided with outwardly extending apertured lugs 55, Fig. 8, each of which is fastened to the adjacent head by means of a screw 56. Then, by means of the handle 11, shaft 7, worm 6 and worm gear 5, the operator rotates shaft 4, and all of the parts carried by it including the core, in the direction of the arrow, Fig. 2, sufficiently to create a pocket between the core and apron 31 which will hold a body of plastic composition which is deposited therein by means of a trowel or in any other suitable manner.

At the start of the operation of the apparatus the rear free end portion of the apron 31 is supported in a vertical position, and tangentially with respect to the exterior of the column that is being formed, by means of one or more cables 43, each provided at one end with a hook 44 separably engaged with the rear end of the apron 31 from which it extends upwardly around a sheave 45 and thence downwardly to a weight 46 that is permanently fastened to its opposite end, said weight serving to maintain the apron 31 taut and under tension during the operation of the apparatus.

In forming a column the operator deposits the plastic material within the bight or pocket a, Fig. 2, between the core and the upwardly extending rear portion of the apron 31, tamping and crowding the same therein by means of a trowel or otherwise. As this pocket is filled up by the operator the shaft 4 and parts carried by it are rotatively adjusted manually in the direction of the arrow, Fig. 2, by means of crank 11 so that eventually the core is surrounded by a body of plastic material which is completely confined within the apron 31. Thus at the completion of the filling operation the apron has been wrapped entirely around the plastic filling on the core.

Before starting the formation of the body of the column with the assistance of the apron 31, the cavities within the annuluses 13 and 27 are first filled with plastic material which is crowded into the same through their open inner ends. Then the operation of building up the body of the column, just described, is proceeded with.

During the operation of molding a column the opposite end portions of the shaft 4 are locked within their sockets 3 by means of removable pins 50 occupying apertures provided for them in the uprights 1.

At the completion of the operation of filling the apron 31 the rear end of the said apron overlaps the forward end thereof as shown in Fig. 6, at which time holes 57, Fig. 7, provided at the rear end of the apron, are brought into register with threaded studs 58, Figs. 6 and 7, provided upon the forward end of the apron, said studs entering and projecting through said holes 57 as the rear end of the apron is laid into position upon the forward end.

Continued rotation of shaft 4 and the parts carried thereby after the ends of the apron are thus brought together brings a pair of lugs 60, provided upon the outer side of the apron at the rear end thereof, into position against an abutment bar 61 that is removably supported by the shoes 47.

The lower sides 62 of the lugs 60 are beveled so as to cam the rear end of the apron laterally against the forward end thereof into the position shown in Fig. 7 and to hold the same in that position while nuts 59 are applied to the threaded studs 58 to fasten the two ends together.

After applying the nuts 59 to the threaded studs 58, the nuts 19 and 29, Fig. 1, are loosened and the eye-bolts 18 and 28 are thrown back out of engagement with the heads 12 and 24 after which power is manually applied to the shaft 7 to rotate the shaft 4 and with it the core and filling of plastic material surrounding the latter while the apron is held against rotation with the shaft 4 by the engagement of the lugs 62 with the abutment bar 61. This relative movement between the plastic material and apron 31 causes the latter to smooth the exterior of the said material and to eliminate air pockets and the like near the surface thereof.

After a column has been thus formed within the apron 31, straps 51 are applied to the exterior of the apron with which may be connected an overhead hoisting and conveying apparatus including cables 53 and hooks 54, Figs. 1 and 3, by means of which the shaft 4 and the parts carried thereby are removed from the apparatus to another location, it being understood that before this removal the pins 50 are withdrawn from the uprights 1 of the frame thereby freeing the opposite ends of shaft 4.

After the plastic material has set, the heads 12 and 24 are removed from shaft 4; the pins 22, Fig. 5, are removed; the screws 56 are removed, and then, after removal of the nuts 59, the apron 31 and annuluses 13 and 27 may be removed. Then by shifting the key slat 36, Fig. 5, toward the middle of the core all of the slats of the latter are freed and can be removed from the column together with the rings 40 and 41.

In order to support the intermediate loaded portion of the sheet metal apron 31 while a comparatively long column is being made, I may provide arcuate shoes or cradles 47 each of which is rigidly supported by means of a pair of bars 48 mounted upon uprights or posts 49 fastened at their lower ends to the floor. Each shoe or cradle 47 includes as part thereof, a series of rolls 47a supporting an endless flexible belt 47b which latter serves as a traveling support on which the strips 32 rest interemdiate their ends as shown in Fig. 1.

What I claim is:

1. An apparatus of the character described comprising a collapsible core provided adjacent each end thereof with a removable head; means rotatably supporting said core in a horizontal position; means for rotatively adjusting said core; a flexible apron having one end thereof separably attached to said heads and means yieldingly supporting the opposite rear end portion of said apron in an upwardly extending position so that as said core is rotatively adjusted and a filling of plastic material is deposited between said core and apron the latter is wrapped around said filling.

2. An apparatus of the character described constructed in accordance with claim 1 and wherein means is also provided for securing said apron in position around said filling.

3. An apparatus of the character described comprising a core provided adjacent each end thereof with a head; means rotatably supporting said core in a horizontal position; means for rotatively adjusting said core; a flexible apron having one end thereof attached to said heads, means yieldingly supporting the opposite rear end portion of said apron in an upwardly extending position so that as said core is rotatively adjusted and a filling of plastic material is deposited between said core and apron the latter is wrapped around said filling, and means for holding said apron stationary while said core and the filling are rotated.

4. An apparatus of the character described constructed in accordance with claim 1 and wherein means is also provided for holding said apron stationary after disconnecting the same from said heads and while said core with its heads and the filling are rotated.

Signed by me at Boston, Suffolk County, Massachusetts, this 18th day of November, 1929.

JOHN J. VICENZI.